(12) United States Patent
Judge et al.

(10) Patent No.: US 9,849,996 B2
(45) Date of Patent: Dec. 26, 2017

(54) ENGINE ELECTRICAL LOAD SHED CONTROL

(71) Applicant: SIKORSKY AIRCRAFT CORPORATION, Stratford, CT (US)

(72) Inventors: John H. Judge, Woodbury, CT (US); Nicholas D. Kefalas, Milford, CT (US); Mark P. Eisenhauer, Milford, CT (US); Frederick L. Bourne, Litchfield, CT (US); Robert J. Andrejczyk, Sandy Hook, CT (US); Michael Patrick Wade, Naugatuck, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 129 days.

(21) Appl. No.: 14/619,442

(22) Filed: Feb. 11, 2015

(65) Prior Publication Data
US 2015/0225089 A1    Aug. 13, 2015

Related U.S. Application Data

(60) Provisional application No. 61/938,383, filed on Feb. 11, 2014.

(51) Int. Cl.
| | |
|---|---|
| *B64D 31/06* | (2006.01) |
| *B64D 45/00* | (2006.01) |
| *B64D 43/00* | (2006.01) |
| *B60R 16/03* | (2006.01) |
| *F02D 41/02* | (2006.01) |
| *F02D 41/10* | (2006.01) |
| *F02D 41/14* | (2006.01) |
| *F02D 29/02* | (2006.01) |

(52) U.S. Cl.
CPC .............. *B64D 31/06* (2013.01); *B60R 16/03* (2013.01); *B64D 43/00* (2013.01); *B64D 45/00* (2013.01); *F02D 29/02* (2013.01); *F02D 41/021* (2013.01); *F02D 41/10* (2013.01); *F02D 41/1497* (2013.01); *B64D 2221/00* (2013.01); *F02D 2250/18* (2013.01); *F02D 2250/22* (2013.01)

(58) Field of Classification Search
CPC ........................... B60R 16/03; B64D 2221/00
See application file for complete search history.

(56) References Cited

U.S. PATENT DOCUMENTS

| | | | |
|---|---|---|---|
| 5,606,245 A | 2/1997 | Kirby | |
| 7,285,871 B2 | 10/2007 | Derouineau | |
| 9,302,636 B2 * | 4/2016 | Schult | B60R 16/03 |
| 9,382,010 B2 * | 7/2016 | Chen | F02C 9/28 |

(Continued)

OTHER PUBLICATIONS

Maasoumy et al., "Optimal Load Management System for Aircraft Electric Power Distribution", 52nd IEEE Conference of Decision and Control, Dec. 2013, pp. 2939-2945.*

(Continued)

*Primary Examiner* — Todd Melton
(74) *Attorney, Agent, or Firm* — Cantor Colburn LLP

(57) ABSTRACT

A method of engine electrical load shed control includes receiving an accessory load indicator corresponding to an accessory load of an engine. A request for acceleration of the engine is detected. One or more electrical buses are depowered based on the accessory load indicator exceeding a shedding threshold and detection of the request for acceleration of the engine.

14 Claims, 4 Drawing Sheets

(56) References Cited

U.S. PATENT DOCUMENTS

| | | | |
|---|---|---|---|
| 2013/0184901 A1* | 7/2013 | Wall | B60W 50/0097 701/3 |
| 2013/0234506 A1 | 9/2013 | Langford et al. | |
| 2014/0125121 A1* | 5/2014 | Edwards | H02J 7/1446 307/9.1 |
| 2014/0333126 A1* | 11/2014 | Vyas | B60R 16/03 307/9.1 |
| 2015/0097422 A1* | 4/2015 | Toothman | H02J 1/12 307/9.1 |

OTHER PUBLICATIONS

Schlabe et al., "Energy Management of Aircraft Electrical Systems—State of the Art and Further Directions", Electrical Systems for Aircraft, Railway and Ship Propulsion (ESARS), Oct. 2012, pp. 1-6.*

* cited by examiner

ENGINE ELECTRICAL LOAD SHED CONTROL

CROSS-REFERENCE TO RELATED APPLICATIONS

This application claims the benefit of U.S. provisional patent application Ser. No. 61/938,383 filed Feb. 11, 2014, the entire contents of which are incorporated herein by reference.

BACKGROUND OF THE INVENTION

The subject matter disclosed herein generally relates to engine control systems, and more particularly to engine electrical load shed control.

Engine acceleration and resultant aircraft handling qualities are often compromised by a requirement to remain below the engine manufacturer's peak loading specifications for such items as an engine-driven direct current (DC) starter/generator (also referred to simply as a "generator") which is geared to an accessory gearbox (AGB) of the engine. Accessory loads on the AGB compete against the ability to quickly accelerate the engine to develop power. Accessory loads can include pumps, generators, and the like. There is a tradeoff between the maximum DC generator loads that can be accommodated by the engine versus an acceleration schedule of the engine. Excessive loads on the AGB consume engine surge margin and, if poorly managed, can lead to engine compressor stall and loss of engine power. As a consequence, the engine manufacturer typically assumes that maximum loads on the AGB are present all the time and penalizes the engine acceleration schedule accordingly. In a rotorcraft, slow engine acceleration can lead to poor rotor speed management, which diminishes handling with excessive yaw disturbances and an inability to arrest descent quickly.

Further, turbine helicopter engines are limited in the amount of power that can be extracted from the AGB as driven by the engine compressor (Ng). The starter/generator is mounted to an engine-compressor-driven pad and directly affects the ability of the engine compressor to accelerate during rapid power demand, as occurs in helicopter maneuvering. If the electrical load is not limited, it could cause an engine surge. The engine acceleration schedule is typically designed for a worst case peak electrical load, assuming the worst case could occur when the engine is least able to tolerate it, such as maximum acceleration from a low-power condition. As such, both the amount of allowable electrical load and the maximum engine acceleration rate are conservatively constrained. This has an undesirable result of limiting system electrical capacity and limiting aircraft maneuvering performance, i.e., handling qualities.

BRIEF DESCRIPTION OF THE INVENTION

According to an aspect of the invention, a method of engine electrical load shed control includes receiving an accessory load indicator corresponding to an accessory load of an engine. A request for acceleration of the engine is detected. One or more electrical buses are depowered based on the accessory load indicator exceeding a shedding threshold and detection of the request for acceleration of the engine.

In addition to one or more of the features described above or below, or as an alternative, further embodiments could include where the accessory load indicator is based on a sensed current of a generator driven by the engine.

In addition to one or more of the features described above or below, or as an alternative, further embodiments could include where the sensed current is crosschecked with respect to a second sensed current of the generator.

In addition to one or more of the features described above or below, or as an alternative, further embodiments could include where the one or more electrical buses are powered by the generator.

In addition to one or more of the features described above or below, or as an alternative, further embodiments could include where one or more bus relays are coupled to the one or more electrical buses and further coupled to direct current power outputs of the generator and a second generator, and the depowering drives a load shed relay that opens the one or more bus relays to electrically decouple the direct current power outputs of the generator and a second generator from the one or more electrical buses.

In addition to one or more of the features described above or below, or as an alternative, further embodiments could include where a first plurality of channels of a first engine control monitors currents of the generator and a second plurality of channels of a second engine control monitors currents of the second generator, and each of the first plurality of channels and the second plurality of channels is operable to drive an instance of the load shed relay.

In addition to one or more of the features described above or below, or as an alternative, further embodiments could include monitoring an engine torque, and comparing the engine torque to a low engine power threshold, where the depowering of the one or more electrical buses is further based on confirming that the engine torque is less than the low engine power threshold.

In addition to one or more of the features described above or below, or as an alternative, further embodiments could include restoring the one or more electrical buses based on one or more of: the engine torque exceeding an engine power threshold that is greater than the low engine power threshold, activation of an engine starter, and a timeout period elapsing without receiving a request to accelerate the engine.

In addition to one or more of the features described above or below, or as an alternative, further embodiments could include where the one or more electrical buses include a battery bus and at least two non-flight critical direct current buses. An advisory message can be sent to a cockpit display based on initiating the depowering of the one or more electrical buses, and a battery-off caution message can be sent to the cockpit display based on confirming that the battery bus is depowered.

According to further aspects of the invention, an engine control system includes a processor and memory having instructions stored thereon that, when executed by the processor, cause the engine control system to receive an accessory load indicator corresponding to an accessory load of an engine. A request for acceleration of the engine is detected. One or more electrical buses are depowered based on the accessory load indicator exceeding a shedding threshold and detection of the request for acceleration of the engine.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In embodiments, an engine control system for an aircraft, such as a rotorcraft, monitors loads on each engine and sheds electrical loads under predetermined conditions. The engine control system is configured to automatically manage non-essential electrical loads based on aircraft operating conditions. A full authority digital engine control (FADEC), i.e., an electronic engine control, can be utilized to directly monitor DC electrical loads and to directly command a shedding/reduction of non-essential DC electrical loads when engine operating conditions demand. Generator load (amperage) is measured by aircraft current sensors as an analog signal which is used as an input to the FADEC for each engine. Each FADEC typically includes at least two separate processing systems, referred to as "channels". Dedicated sensors, one-each per FADEC channel, provide for crosscheck fault detection and redundancy. FADEC hardwired outputs are employed to directly and redundantly activate aircraft load shed relays to shed non-essential DC electrical loads. Loads may be disconnected for approximately 1 to 10 seconds, to allow sufficient time for the engine to accelerate with reduced loading. The FADEC can annunciate status and caution messages to the pilot upon activation of the load shedding, confirmation of load shedding, and detected load shed related error conditions.

The result of selective load shedding is a higher electrical system load capability and higher engine acceleration capability than otherwise possible. The higher acceleration capability improves aircraft handling by minimizing rotor droop during maneuvering. The system allows for seamless operation of electrical load shed management to the flight crew. It employs system redundancy and fault checks for system integrity, and a failsafe design with appropriate pilot warning. Embodiments provide a helicopter engine FADEC control system that has feedback of aircraft DC load conditions that are used to provide enhanced capacity to control engine operating characteristics.

Figure 1:
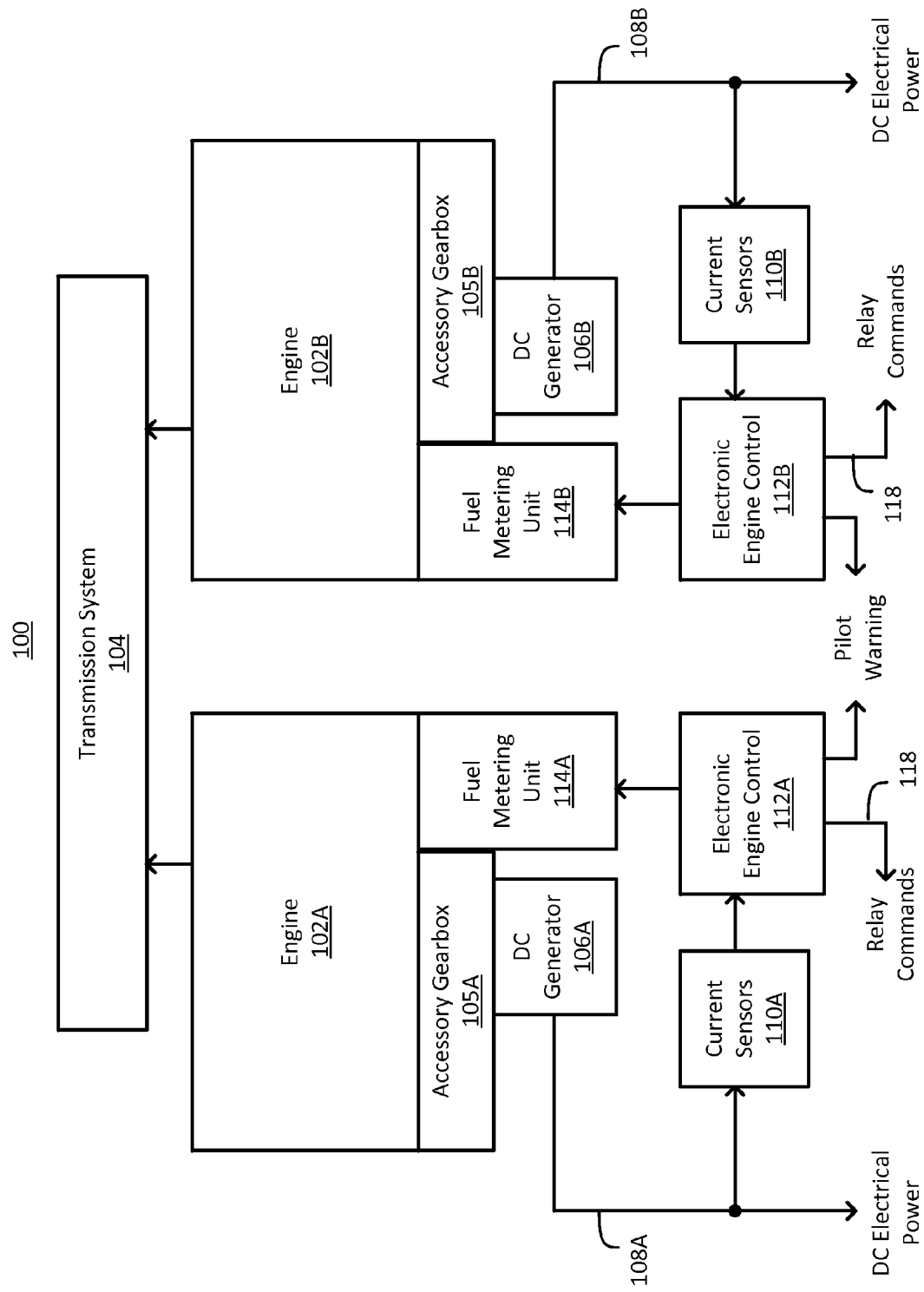
FIG. 1 schematically depicts an engine system in accordance with an embodiment.

FIG. 1 schematically depicts an engine system 100 in accordance with embodiments. In the example of FIG. 1, a first engine 102A and a second engine 102B are mechanically coupled through a transmission system 104 that can drive a rotor of a rotorcraft. Engine 102A drives an accessory gearbox 105A, which in turn drives a DC generator 106A and other accessory loads (not depicted), such as fuel pumps, hydraulic fluid pumps, pneumatic pressure pumps, and the like. The DC generator 106A provides DC electrical power 108A to multiple locations. One or more current sensors 110A monitor the DC electrical power 108A and provide current sensor input to electronic engine control 112A (which is also be referred to as a FADEC). The electronic engine control 112A monitors a number of parameters of the engine 102A and receives input from other sources (not depicted), such as a flight management computer, pilot inputs, and the like. The electronic engine control 112A outputs a fuel metering unit command to a fuel metering unit 114A that establishes a rate of fuel flow to the engine 102A.

Similarly, engine 102B drives an accessory gearbox 105B, which in turn drives a DC generator 106B and other accessory loads (not depicted). The DC generator 106B provides DC electrical power 108B to multiple locations. One or more current sensors 110B monitor the DC electrical power 108B and provide current sensor input to electronic engine control 112B. The electronic engine control 112B monitors a number of parameters of the engine 102B and receives input from other sources (not depicted), such as a flight management computer, pilot inputs, and the like. The electronic engine control 112B outputs a fuel metering unit command to a fuel metering unit 114B that establishes a rate of fuel flow to the engine 102B. The electronic engine controls 112A and 112B can each output one or more relay commands 118 that control electrical load shedding of DC electrical loads normally powered by DC electrical power 108A and 108B. Further load shedding details are described herein with respect to FIGS. 2-4.

Figure 2:
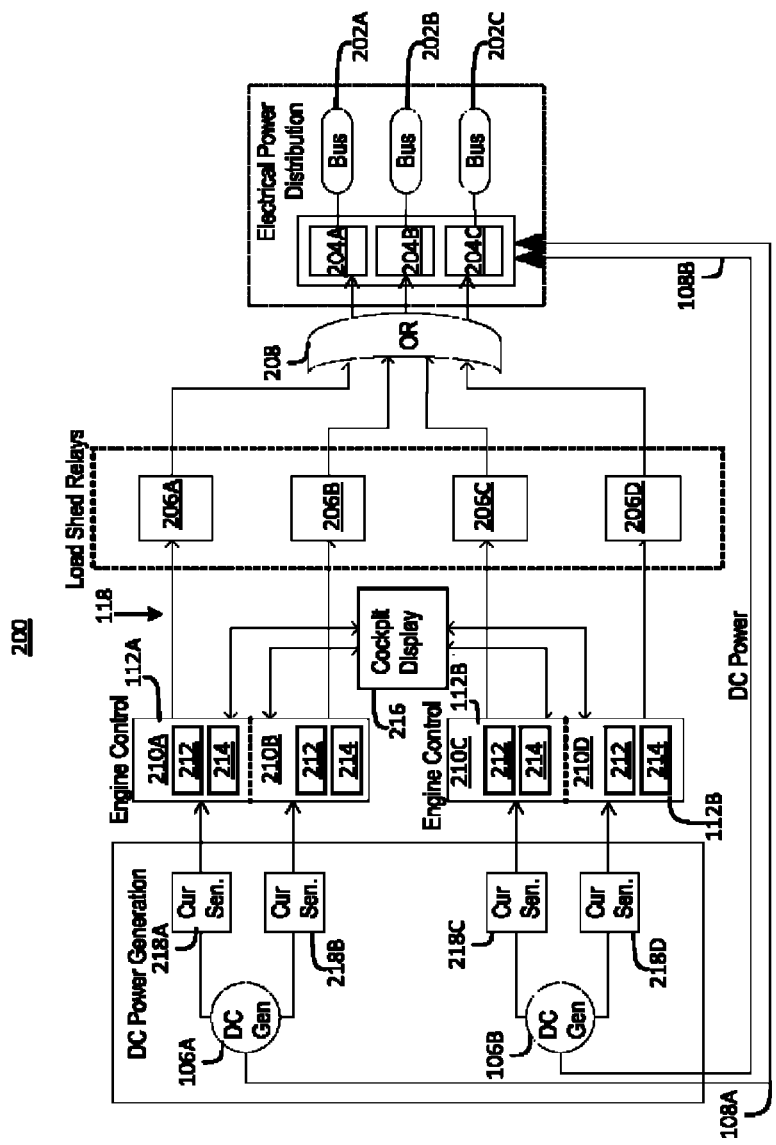
FIG. 2 schematically depicts a load shed subsystem of the engine system of FIG. 1 in accordance with an embodiment.

FIG. 2 schematically depicts a load shed subsystem 200 of the engine system 100 of FIG. 1 in accordance with an embodiment. DC power generation is provided by the DC generators 106A and 106B to output DC electrical power 108A and 108B for electrical power distribution via electrical buses 202A, 202B, and 202C. In the example of FIG. 2, electrical buses 202A and 202B are non-flight critical DC buses and electrical bus 202C is a battery bus. Electrical accessory loads, such as air conditioning systems, cabin entertainment systems and various DC-power aircraft accessories can draw DC power from the electrical buses 202A and 202B. Electrical bus 202C can supply DC power to recharge one or more batteries. Bus relays 204A, 204B, and 204C are coupled to electrical buses 202A, 202B, and 202C and further coupled to DC electrical power 108A and 108B. Load shed relays 206A, 206B, 206C, and 206D are wired through a logical OR-gate function 208 to the bus relays 204A-204C such that any one of the load shed relays 206A-206D drive all of the bus relays 204A-204C open to electrically decouple the DC electrical power 108A and 108B from the electrical buses 202A-202C. Opening of the bus relays 204A-204C electrically sheds loads of the electrical buses 202A-202C from the DC generators 106A and 106B, which results in a load reduction at the accessory gearboxes 105A and 105B of FIG. 1. Load reduction at the accessory gearboxes 105A and 105B of FIG. 1 results in a load reduction of engines 102A and 102B of FIG. 1, which enables a faster rate of acceleration through the transmission system 104 of FIG. 1.

In the example of FIG. 2, engine control 112A includes a first plurality of channels 210A and 210B, and engine control 112B includes a second plurality of channels 210C and 210D. Each of the channels 210A-210D includes a processor 212 and memory 214. Processor 212 can be any type or combination of computer processors, such as a microprocessor, microcontroller, digital signal processor, application specific integrated circuit, programmable logic device, and/or field programmable gate array. The memory 214 is an example of a non-transitory computer readable storage medium tangibly embodied in channels 210A-210D including executable instructions stored therein, for instance, as firmware. An example of instructions that can be stored in the memory 214 for execution by processor 212 include load shedding logic that drives the load shed relays 206A-206D. Each of the channels 210A-210D is coupled to one of the current sensors 218A-218D and is operable to send a pilot warning to a cockpit display 216. Current sensor 218A provides a sensed current of DC generator 106A to channel 210A, and current sensor 218B provides a sensed current of DC generator 106A to channel 210B. Current sensor 218C provides a sensed current of DC generator 106B to channel 210C, and current sensor 218D provides a sensed current of DC generator 106B to channel 210D. Current sensors 218A and 218B are examples of the one or more current sensors 110A of FIG. 1, and current sensors 218C and 218D are examples of the one or more current sensors 110B of FIG. 1.

The sensed current from the current sensors 218A-218D is used by channels 210A-210D respectively as an accessory load indicator corresponding to an accessory load of an engine. Channels 210A-210D also monitor a number of other parameters related to aircraft and engine conditions to determine when load shedding is needed. Any one of the channels 210A-210D can depower the electrical buses 202A-202C by driving one of the load shed relays 206A-206D when load shedding conditions are detected. For example, channel 210A may detect request for acceleration of engine 102A of FIG. 1 based on an increase in a collective command when the engine system 100 of FIG. 1 is part of a twin-engine helicopter. Channel 210A may also receive a sensed current from current sensor 218A as an accessory load indicator corresponding to an accessory load of DC generator 106A. Channel 210A can drive load shed relay 206A via one of the relay commands 118 to open the bus relays 204A-204C, resulting in depowering of the electrical buses 202A-202C based on the accessory load indicator exceeding a shedding threshold and the detected request for acceleration of the engine 102A of FIG. 1, for instance. Once conditions for load shedding are no longer present, load shed relays 206A-206D can be reset by the channels 210A-210D to close the bus relays 204A-204C and restore DC electrical power 108A and 108B to the electrical buses 202A-202C. Thus, if channel 210A triggered load shedding, channel 210A can also restore the loads.

Figure 3:
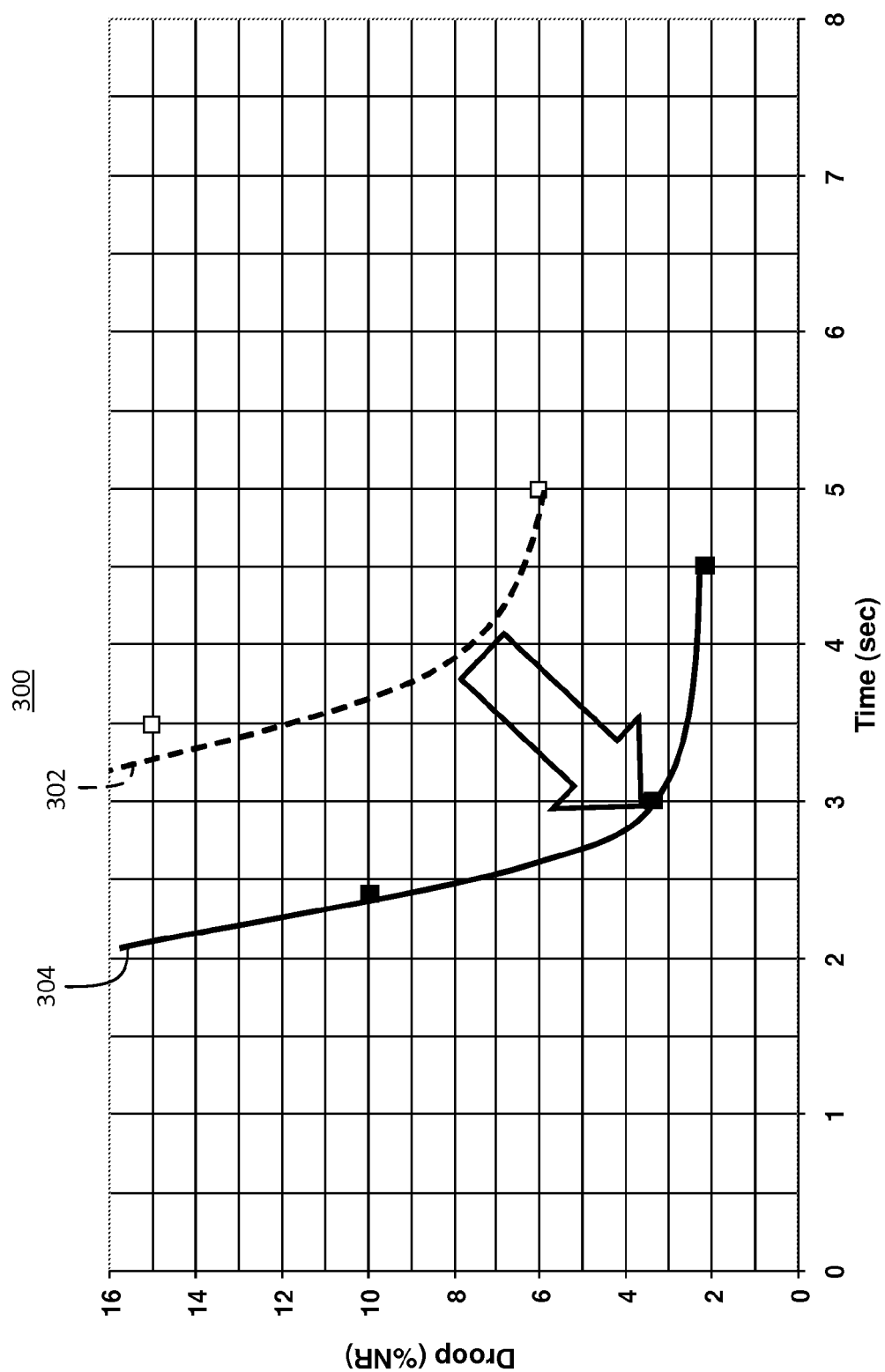
FIG. 3 depicts an example of an aircraft handling adjustment resulting from load shedding in accordance with an embodiment.

FIG. 3 depicts an example of an aircraft handling (rotor droop) adjustment resulting from load shedding performed by the load shed subsystem 200 of FIG. 2 in accordance with an embodiment. Plot 300 of FIG. 3 illustrates an example of rotor droop (percent drop in rotor speed) versus time for a baseline response 302 and a load shedding response 304. As a pilot pulls on a collective of a helicopter that does not include load shed subsystem 200 of FIG. 2, rotor droop from idle to maximum continuous power is represented by the baseline response 302, where maximum power is reached in about 5 seconds with about 6% rotor droop in this example. When the same helicopter having the baseline response 302 is equipped with the load shed subsystem 200 of FIG. 2, rotor droop from idle to maximum continuous power is represented by the load shedding response 304, where maximum power is reached in about 4.5 seconds with about 2% rotor droop in this example.

Figure 4:
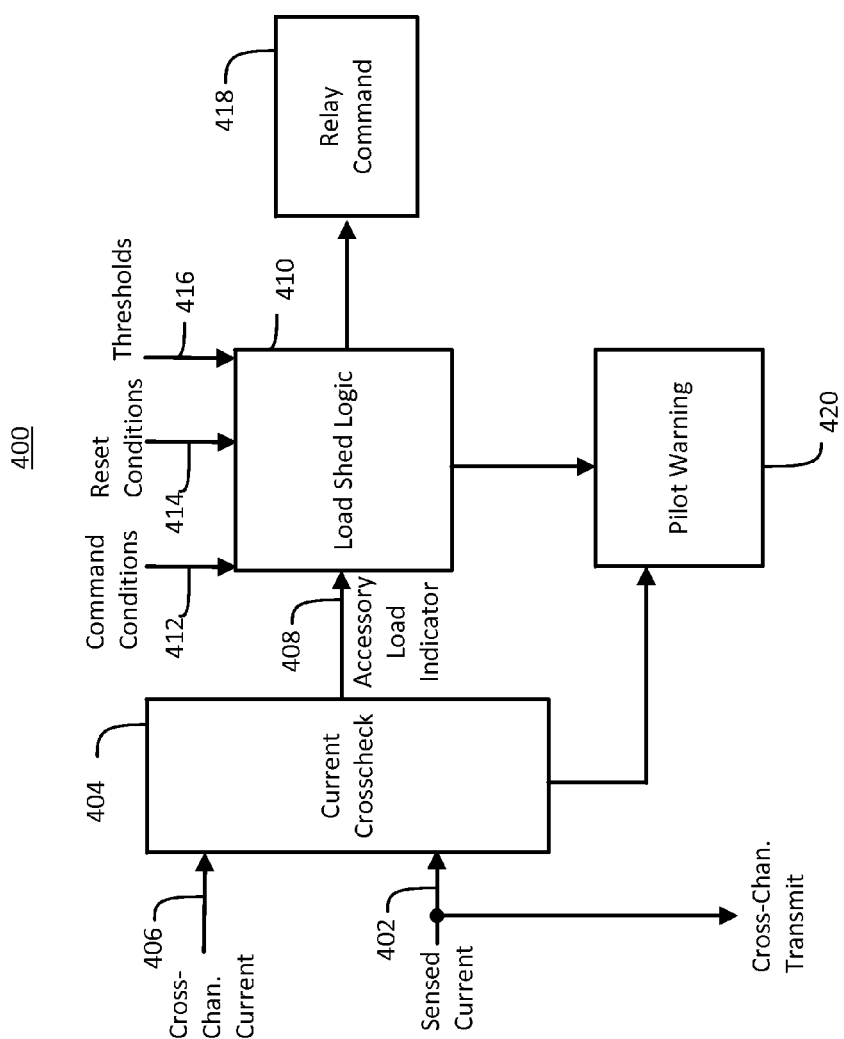
FIG. 4 schematically depicts a block diagram of a data flow for engine electrical load shed control in accordance with embodiments.

FIG. 4 schematically depicts a block diagram of a data flow 400 for engine electrical load shed control in accordance with embodiments. The data flow 400 represents a portion of engine control logic that can be stored in memory 214 and executed by processor 212 in each of the channels 210A-210D of FIG. 2. In data flow 400, a sensed current 402 is received at a current crosscheck 404 to be used as an accessory load indicator 408 corresponding to an accessory load of an engine, such as engine 102A or 102B of FIG. 1. The accessory load indicator 408 can be based on a sensed current of a generator driven by an engine from the current sensors 218A-218D of FIG. 2. The sensed current 402 is crosschecked by the current crosscheck 404 with respect to a cross-channel current 406 which is a second sensed current of the same generator. For example, with respect to engine control 112A of FIG. 2, current sensor 218A supplies sensed current 402 to channel 210A and current sensor 218B supplies cross-channel current 406 via channel 210B. In the event that the sensed current 402 is corrupted, the cross-channel current 406 may be used as the accessory load indicator 408. A mismatch or detected error with respect to the sensed current 402 and the cross-channel current 406 may also trigger a pilot warning 420 on the cockpit display 216 of FIG. 2. If the sensed current 402 and the cross-channel current 406 are valid and in-range, the accessory load indicator 408 may be determined as the average of the sensed current 402 and the cross-channel current 406. The accessory load indicator 408 can be converted to engineering units other than amperage, such as a shaft horsepower.

Load shed logic 410 monitors a number of command conditions 412 and reset conditions 414 with respect to thresholds 416 to drive a relay command 418 to one of the load shed relays 206A-206D of FIG. 2. Examples of command conditions 412 include an engine torque that indicates engine power level or engine speed, a rotor speed, an in-flight indication, a collective position indicative of a request for acceleration, an engine-starter active indication, a battery depletion indication, and/or other aircraft and engine state data known in the art. Examples of reset conditions 414 include an engine torque that indicates engine power level or engine speed, a collective position indicative of a request for acceleration, and an engine starter-active indication. Thresholds 416 define various limits to command load shed and to restore loads. For example, the thresholds 416 can include different engine power thresholds for initiating a load shed and restoring loads.

In an embodiment, the load shed logic 410 receives the accessory load indicator 408 corresponding to an accessory load of an engine, such as engine 102A or 102B of FIG. 1. The load shed logic 410 detects a request for acceleration of the engine from the command conditions 412, e.g., an indication of pilot pull on a collective control. The load shed logic 410 drives a relay command 418, as one of the relay commands 118 of FIGS. 1 and 2, to depower electrical buses 202A-202C of FIG. 2 based on the accessory load indicator 408 exceeding a shedding threshold of the thresholds 416 and the detected request for acceleration of the engine. The depowering commanded by the relay command 418 drives one of the load shed relays 206A-206D that opens the bus relays 204A-204C to electrically decouple DC power 108A and 108B from the electrical buses 202A-202C of FIG. 2. The load shed logic 410 can monitor an engine torque received in the command conditions 412 and compare the engine torque to a low power threshold of the thresholds 416. The load shed logic 410 may also base the depowering of the electrical buses 202A-202C of FIG. 2 on confirming that the engine torque is less than the low engine power threshold. As one example, the low engine power threshold may be set to a value of about 5%. Further example of conditions that may result in commanding a load shed include confirming that the aircraft is in flight and determining that engine starters are inactive.

The use of engine torque as a condition that commands load shedding is considered in combination with acceleration. Electrical load shedding may only be needed when there are sufficiently high electrical loads (e.g., about 250 amps continuous) and the engine is accelerating from a very low engine torque/power condition. Load shedding may not be needed for acceleration at a higher engine torque/power condition, because the engine can accommodate higher electrical loads. Therefore, this embodiment prevents unnecessary shedding of high electrical loads, such that load shedding only occurs when accelerating with high electrical loads at low engine power. This minimizes the undesirable effect of electrical equipment turning off frequently when the engine accelerates. Similarly, other conditions which minimize the occurrence of unnecessarily commanding load shed can be considered by the load shed logic 410, such as checking a weight-on-wheels indicator to confirm whether the aircraft is in-flight or on the ground.

The load shed logic 410 can control the relay command 418 to restore the loading of electrical buses 202A-202C of FIG. 2 based one or more of: the engine torque exceeding an engine power threshold that is greater than the low engine power threshold, activation of an engine starter, and a timeout period elapsing without receiving a request to accelerate the engine. As one example, the engine power threshold can be set to a value of about 25%. The timeout period may be set to about 10 seconds, where the maximum expected time from idle to maximum acceleration is about 8 seconds. The timeout period provides a failsafe to restore loads in case of abnormally slow acceleration.

The load shed logic 410 can also send a pilot warning 420 to the cockpit display 216 of FIG. 2 based on various conditions. For instance, the load shed logic 410 can send an advisory message to the cockpit display 216 based on initiating the depowering of electrical buses 202A-202C. Where one of the electrical buses 202A-202C is a battery bus, such as electrical bus 202C, the load shed logic 410 may send a battery-off caution message to the cockpit display 216 based on confirming that the battery bus is depowered. Other types of error conditions or status information can also be included in the pilot warning 420.

Technical effects include commanding electrical load shedding by an engine control system without pilot input to remove electrical loads under low engine power in combination with high acceleration demand conditions, as well as other conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of engine electrical load shed control, the method comprising:
monitoring an engine torque;
receiving an accessory load indicator corresponding to an accessory load powered by an engine;
detecting a request for acceleration of the engine;
comparing the engine torque to a low engine power threshold; and
depowering one or more electrical buses providing power to the accessory load to reduce a rotor droop associated with the acceleration of the engine based on detecting the request for acceleration of the engine when the engine torque is less than the low engine power threshold and the accessory load indicator exceeds a shedding threshold.

2. The method of claim 1, wherein the accessory load indicator is based on a sensed current of a generator driven by the engine.

3. The method of claim 2, wherein the sensed current is crosschecked with respect to a second sensed current of the generator.

4. The method of claim 2, wherein the one or more electrical buses are powered by the generator.

5. The method of claim 4, wherein one or more bus relays are coupled to the one or more electrical buses and further coupled to direct current power outputs of the generator and a second generator, and the depowering drives a load shed relay that opens the one or more bus relays to electrically decouple the direct current power outputs of the generator and a second generator from the one or more electrical buses.

6. The method of claim 5, wherein a first plurality of channels of a first engine control monitors currents of the generator and a second plurality of channels of a second engine control monitors currents of the second generator, and each of the first plurality of channels and the second plurality of channels is operable to drive an instance of the load shed relay.

7. The method of claim 1, further comprising:
restoring the one or more electrical buses based on or more of: the engine torque exceeding an engine power threshold that is greater than the low engine power threshold, activation of an engine starter, and a timeout period elapsing without receiving a request to accelerate the engine.

8. The method of claim 1, wherein the one or more electrical buses comprise a battery bus and at least two non-flight critical direct current buses, and further comprising:
sending an advisory message to a cockpit display based on initiating the depowering of the one or more electrical buses; and
sending a battery-off caution message to the cockpit display based on confirming that the battery bus is depowered.

9. An engine control system comprising:
a processor; and
memory having instructions stored thereon that, when executed by the processor, cause the engine control system to:
monitor an engine torque;
receive an accessory load indicator corresponding to an accessory load powered by an engine;
detect a request for acceleration of the engine;
comparing the engine torque to a low engine power threshold; and
reduce a rotor droop associated with the acceleration of the engine by depowering one or more electrical buses providing power to the accessory load based on detecting the request for acceleration when the engine torque is less than the low engine power threshold and the accessory load indicator exceeds a shedding threshold.

10. The engine control system of claim 9, wherein the accessory load indicator is based on a sensed current of a generator driven by the engine, and the one or more electrical buses are powered by the generator.

11. The engine control system of claim 10, wherein one or more bus relays are coupled to the one or more electrical buses and further coupled to direct current power outputs of the generator and a second generator, and the depower drives a load shed relay that opens the one or more bus relays to electrically decouple the direct current power outputs of the generator and a second generator from the one or more electrical buses.

12. The engine control system of claim 11, wherein a first plurality of channels of a first engine control monitors currents of the generator and a second plurality of channels of a second engine control monitors currents of the second generator, and each of the first plurality of channels and the second plurality of channels is operable to drive an instance of the load shed relay.

13. The engine control system of claim 9, wherein the instructions further cause the engine control system to:
   restore the one or more electrical buses based on one or more of: the engine torque exceeding an engine power threshold that is greater than the low engine power threshold, activation of an engine starter, and a timeout period elapsing without receiving a request to accelerate the engine.

14. The engine control system of claim 9, wherein the one or more electrical buses comprise a battery bus and at least two non-flight critical direct current buses, and wherein the instructions further cause the engine control system to:
   send an advisory message to a cockpit display based on an initiation of the depower of the one or more electrical buses; and
   send a battery-off caution message to the cockpit display based on a confirmation that the battery bus is depowered.

* * * * *